United States Patent [19]

Yurko

[11] Patent Number: 5,080,209

[45] Date of Patent: Jan. 14, 1992

[54] MANUAL OVERRIDE OF AN AUTOMATIC RATIO CONTROLLER IN A HYDROMECHANICAL TRANSMISSION

[75] Inventor: William E. Yurko, Pittsfield, Mass.

[73] Assignee: General Electric Company, Pittsfield, Mass.

[21] Appl. No.: 597,602

[22] Filed: Oct. 15, 1990

[51] Int. Cl.⁵ .................. B60K 41/24; F16D 67/00; B62D 11/00

[52] U.S. Cl. .................. 192/4 C; 192/3.63; 192/3.57; 74/473 R; 74/479; 180/6.3; 180/133

[58] Field of Search .................. 180/6.3, 6.32, 6.44, 180/133; 74/473 R, 479; 475/24; 192/4 C, 3.63, 3.57

[56] References Cited

U.S. PATENT DOCUMENTS

| | | | |
|---|---|---|---|
| 2,344,881 | 3/1944 | Jory .................. | 192/4 C X |
| 2,665,904 | 1/1954 | Lehmann .................. | 268/124 |
| 2,753,024 | 7/1956 | Weaving et al. .................. | 192/3.57 |
| 3,114,424 | 12/1963 | Voreaux et al. .................. | 180/6.3 |
| 3,349,860 | 10/1967 | Ross .................. | 475/24 X |
| 3,401,522 | 9/1968 | Hann et al. .................. | 74/473 R X |
| 3,543,891 | 12/1970 | Mathers .................. | 192/4 C X |
| 3,592,281 | 7/1971 | Utter et al. .................. | 475/24 X |
| 3,650,159 | 3/1972 | Cockrell et al. .................. | 475/24 |
| 3,795,157 | 3/1974 | Campbell et al. .................. | 74/473 R X |
| 3,815,698 | 6/1974 | Reed .................. | 180/6.48 |
| 3,993,175 | 11/1976 | Beveridge .................. | 192/3.57 |
| 4,116,313 | 9/1978 | Maucher .................. | 192/3.63 |
| 4,128,151 | 12/1978 | Grosseau .................. | 192/4 C X |
| 4,138,903 | 2/1979 | Burdette et al. .................. | 74/473 R |
| 4,146,120 | 3/1979 | Stevens .................. | 192/3.57 X |
| 4,208,929 | 6/1980 | Heino et al. .................. | 74/731 |
| 4,345,488 | 8/1982 | Reed .................. | 74/682 |
| 4,458,799 | 7/1984 | Schueller .................. | 192/4 C X |
| 4,463,628 | 8/1984 | Ahlschwede et al. .................. | 74/861 |
| 4,465,167 | 8/1984 | Fujioka .................. | 192/3.57 |
| 4,625,842 | 12/1986 | King .................. | 74/473 R X |
| 4,671,394 | 6/1987 | Braun .................. | 192/3.57 |
| 4,698,048 | 10/1987 | Rundle .................. | 74/473 R X |
| 4,724,726 | 2/1988 | Knecht .................. | 192/4 C X |
| 4,768,636 | 9/1988 | Ito et al. .................. | 192/4 C X |
| 4,916,983 | 4/1990 | Amrein et al. .................. | 74/878 |

Primary Examiner—Allan D. Herrmann
Assistant Examiner—Julie Krolikowski
Attorney, Agent, or Firm—Bailin L. Kuch; Robert A. Cahill

[57] ABSTRACT

To override the vehicle immobilizing effect of a failed automatic ratio controller in a hydromechanical transmission, the conventional manually shiftable range selector is loosely linked with a ratio arm while the latter is being stroked by the controller to vary hydrostatic output speed. Upon controller failure, the range selector is drivingly linked with the ratio arm, such that shifting movements of the range selector are translated into stroking movements of the ratio arm to provide manual control of vehicle propulsion. Safeguards are provided to ensure that conversion between the normal propulsion mode governed by the automatic ratio controller and the override propulsion mode manually governed by the vehicle operator is effected in a safe manner.

20 Claims, 4 Drawing Sheets

MANUAL OVERRIDE OF AN AUTOMATIC RATIO CONTROLLER IN A HYDROMECHANICAL TRANSMISSION

This invention was made with US Government support under Contract DAAE07-87-C-R066 awarded by the US Army. The US Government has certain rights in the invention.

The present invention relates to hydromechanical transmissions and particularly to infinitely variable speed hydromechanical transmission having an automatic ratio controller.

BACKGROUND OF THE INVENTION

State-of-the-art hydromechanical transmissions, such as utilized in modern military tanks, are equipped with automatic (electronic) ratio controllers acting to adjustably vary the displacements (strokes) of the hydraulic pumps in the transmission hydrostatic pump/motor drive units to achieve vehicle propulsion at speeds requested by the operator. Thus, the operator has no direct control over pump stroke, i.e., transmission ratio. In the event of a loss of electrical power or a failure of the automatic ratio controller, the vehicle is immobilized, even though its engine remains running.

It is accordingly an object of the present invention to provide method and apparatus for retaining vehicle mobility despite failure of the electrical/electronic controller for the vehicle's hydromechanical transmission.

An additional object is to provide apparatus of the above-character for manually overriding the automatic ratio controller in a hydromechanical transmission such as accommodate direct operator control of pump stroke in the transmission hydrostatic drive units.

A further object is to provide manual override apparatus of the above-character, wherein the conversion from automatic to manual control of pump stroke is achieved in an expeditious and safe manner.

Another object is to provide manual override apparatus of the above-character, which can be readily implemented in hydromechanical transmissions without disturbing the automatic ratio controller interface.

Yet another object is to provide manual override apparatus of the above character, wherein the operator control interface is simple and convenient to use.

Other objects of the invention will in part be obvious and in part appear hereinafter.

SUMMARY OF THE INVENTION

In accordance with the present invention, a manual override apparatus is provided to accommodate operator control of transmission ratio and thus retain vehicle mobility in the event of failure of the automatic or electronic ratio controller in a hydromechanical transmission. To this end, the apparatus includes a linkage between the conventional, manually operated range selector and the conventional ratio arm which is normally driven by the automatic ratio controller to adjust hydraulic motor displacement in the transmission hydrostatic drive unit(s) to a stroke position satisfying the vehicle speed requested by the operator. In the normal propulsion mode, the linkage is of a lost-motion character, permitting independent manual shifting motion of the range selector and stroking motion of the ratio arm by the automatic ratio controller. To override the automatic ratio controller in the event it becomes inoperative and thus invoke a self-recovery propulsion mode, a self-recovery mechanism is activated to change the character of the linkage to one capable of translating shifting motion of the range selector to stroking motion of the ratio arm. As a result, vehicle propulsion is rendered manually controllable in response to shifting motions of the range selector by the operator.

As an important feature of the invention the self-recovery mechanism also moves the ratio arm to a zero stroke position, i.e., zero hydrostatic output, and, via the linkage, references the ratio arm zero stroke position to the neutral position of the range selector. Thus, range selector shifting movement away from its neutral position in one direction strokes the ratio arm positively to produce forward vehicle propulsion and shifting movement away from its neutral position in the opposite direction strokes the ratio arm negatively to produce reverse vehicle propulsion. An interlock is also provided to prevent propulsion mode conversion unless and until the conditions of engine-transmission disengagement and range selector neutral position are met by the operator.

The invention accordingly comprises the features of construction, combination of elements and arrangement of parts, as well as their method of operation, all of which as detailed below, and the scope of the invention will be indicated in the claims.

BRIEF DESCRIPTION OF THE DRAWINGS

For a full understanding of the nature and objects of the present invention, reference may be had to the following Detailed Description taken in conjunction with the following drawings, wherein.

Corresponding reference numerals refer to like parts throughout the several views of the drawing.

DETAILED DESCRIPTION

Figure 1:
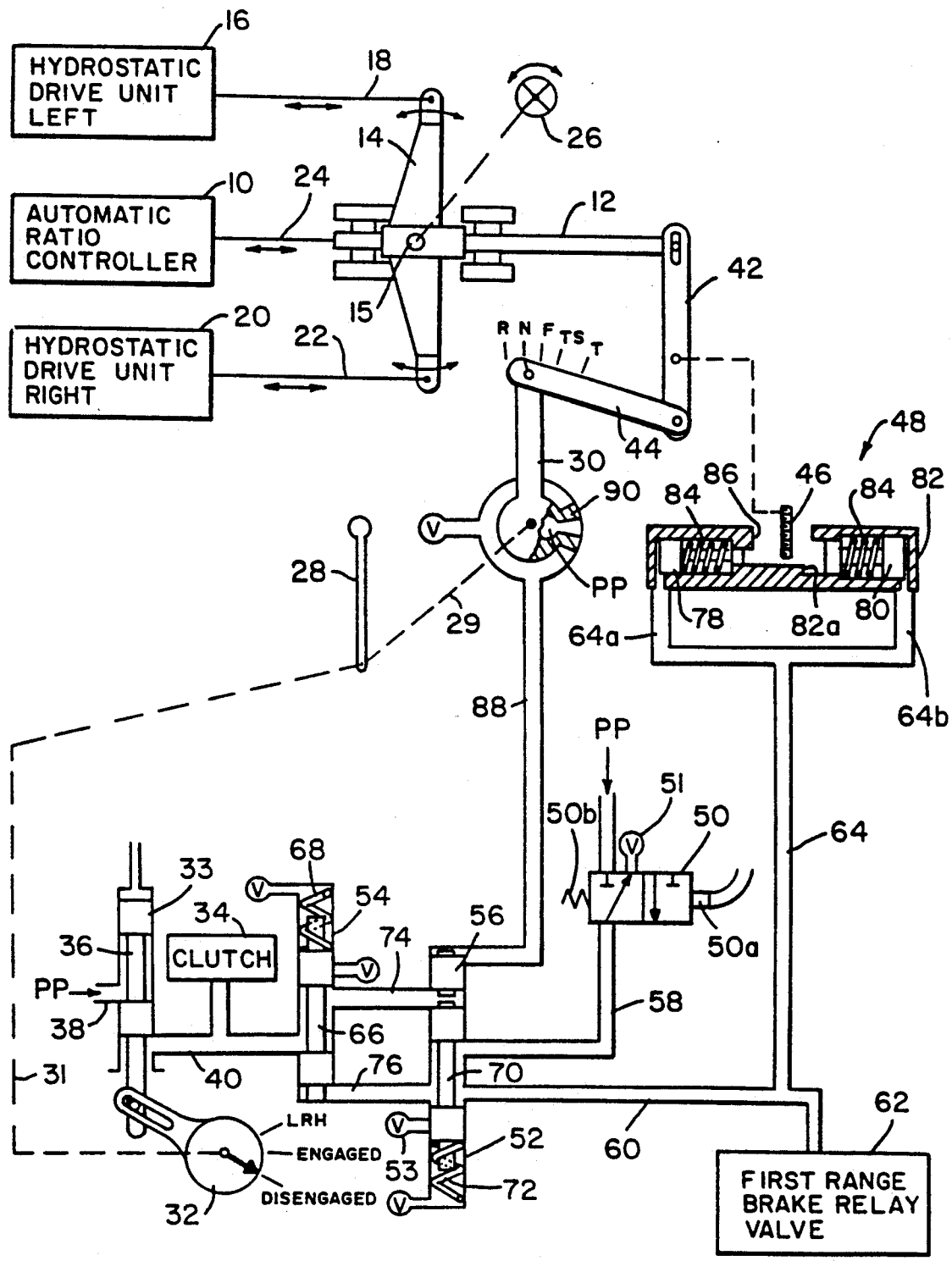
FIG. 1 is a schematic diagram of manual override apparatus constructed in accordance with the present invention in its application to a hydromechanical transmission equipped with an automatic ratio controller.

The manual override apparatus of the present invention is illustrated in FIG. 1 in its application to a hydromechanical steering transmission for tracklaying or skid-steered vehicles, such as military tanks. Examples of such transmissions are disclosed in U.S. Pat. Nos. 3,815,698 and 4,345,488 issued to B. O. Reed. Hydromechanical steering transmissions of this type utilize a pair of hydrostatic drive units, each consisting of a hydraulic pump and a hydraulic motor connected in a hydraulic loop circuit. The pumps of each unit are driven in parallel by the mechanical output of the vehicle engine to pump hydraulic fluid through their respective motors and produce respective hydrostatic outputs. These hydrostatic outputs are then combined with the mechanical output of the engine in combining gear sets to produce separate hydromechanical outputs driving the left and right vehicle tracks. By varying the displacements, i.e. strokes, of the hydraulic pumps, the speed of the hydrostatic outputs can be infinitely varied. Typically, the first or lowest speed range of the transmission is a combined forward and reverse propulsion range driven exclusively by the hydrostatic outputs of the hydrostatic drive units. Stroking the hydraulic pumps in one direction, e.g. positive direction, from zero stroke (zero displacement) produces vehicle propulsion in the forward direction and stroking in the negative direction from zero stroke propels the vehicle in the reverse direction. Propulsion in higher speed ranges is achieved by superimposing or combining the hydrostatic outputs with the mechanical output of a range-changing gear pack driven by the engine. Speed variation within each range is achieved by uniformly stroking the hydraulic pumps to vary the hydrostatic output speed correspondingly. Steering in each range is accomplished by differentially varying the pump strokes, typically in equal and opposite directions, to produce a corresponding differential in the speeds of the left and right vehicle tracks.

As noted above, modern hydromechanical transmissions utilize electronic controllers for establishing the optimum transmission ratio in terms of performance and fuel efficiency necessary to propel the vehicle at the speed requested by the operator. Thus, as seen in FIG. 1, an automatic ratio controller 10 linearly translates a ratio arm 12 back and forth, typically via a stepping motor (not shown). Pivotally connected to the ratio arm at its mid-length point is a crossarm 14 having one end connected to a left hydrostatic drive unit 16 by a stroking link 18 and its other end connected to a right hydrostatic drive unit 20 by a stroking link 22. It is thus seen that as the controller drives the ratio arm back and forth via link 24, the hydraulic pumps of the hydrostatic drive units 16 and 20 are uniformly stroked to produce variable speed straightline propulsion. To execute a steering maneuver, crossarm 14 is pivoted about its mid-length connection 15 with ratio arm 12 by a manual steering control 26 to produce equal and opposite strokings of the hydrostatic drive units.

A manually shiftable range selector lever 28 is mechanically connected, as indicated at 28, to a range selector arm 30 for operator positioning to various transmission operating ranges or modes. The range selector lever is also mechanically connected, as indicated at 31, to a disconnect selector 32 for manually controlling the position of a pilot valve, generally indicated at 33. This pilot valve controls the application of priority hydraulic pressure PP to a main clutch 34 engaging the vehicle engine with the hydromechanical transmission.

Figure 2:
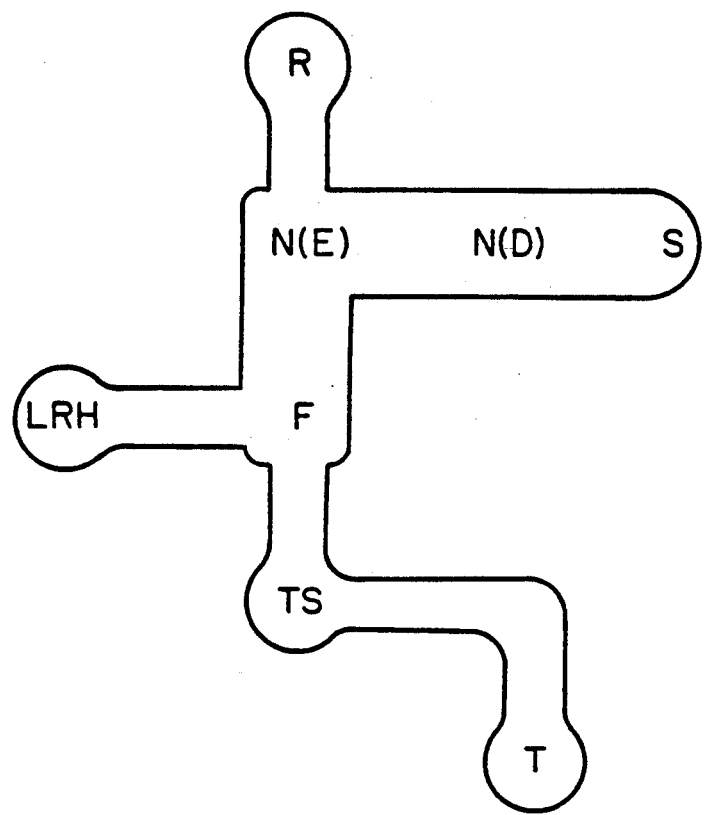
FIG. 2 depicts a typical shift pattern for the manual range select seen in FIG. 1.

A typical shift pattern for lever 28 is illustrated in FIG. 2. As seen therein, the range selector lever is shifted into vertically aligned reverse R, neutral-engaged N(E), forward F and tow-start TS range positions to condition the transmission accordingly. While the range selector lever is positioned in the path of these aligned range positions, disconnect selector 32 is angularly oriented in the ENGAGED position to pull the spool 36 of pilot valve 33 sufficiently downward to communicate the priority hydraulic pressure in line 38 to line 40 and clutch 34, thereby effecting engagement of the vehicle engine to the hydromechanical transmission. From the neutral engaged position N(E), the range selector lever is shifted rightward to a neutral-disengaged position N(D) and beyond to an engine-start position S. While the range selector lever is in the neutral-disengaged and start positions, disconnect selector 32 is shifted to the DISENGAGED position illustrated in FIG. 1. As a result, spool 36 is positioned upwardly to block line 38, and thus remove priority hydraulic pressure from clutch 34, effecting disengagement of the engine and transmission. From the forward range position, the range selector lever is shifted leftward to a low range hold position LRH, locking the transmission in the low or first propulsion range. From the tow-start range position, lever 28 is shifted rightward and then downward to a tow position T. As in the case of shifting from the neutral-engaged position to the neutral-disengaged position, rightward movement of the range selector lever shifts the disconnect selector from its ENGAGED to its DISENGAGED positions. Thus, rightward lateral movements of the lever are communicated only to the disconnect selector, while vertical lever movements are communicated only to range selector arm 30.

Figure 3:
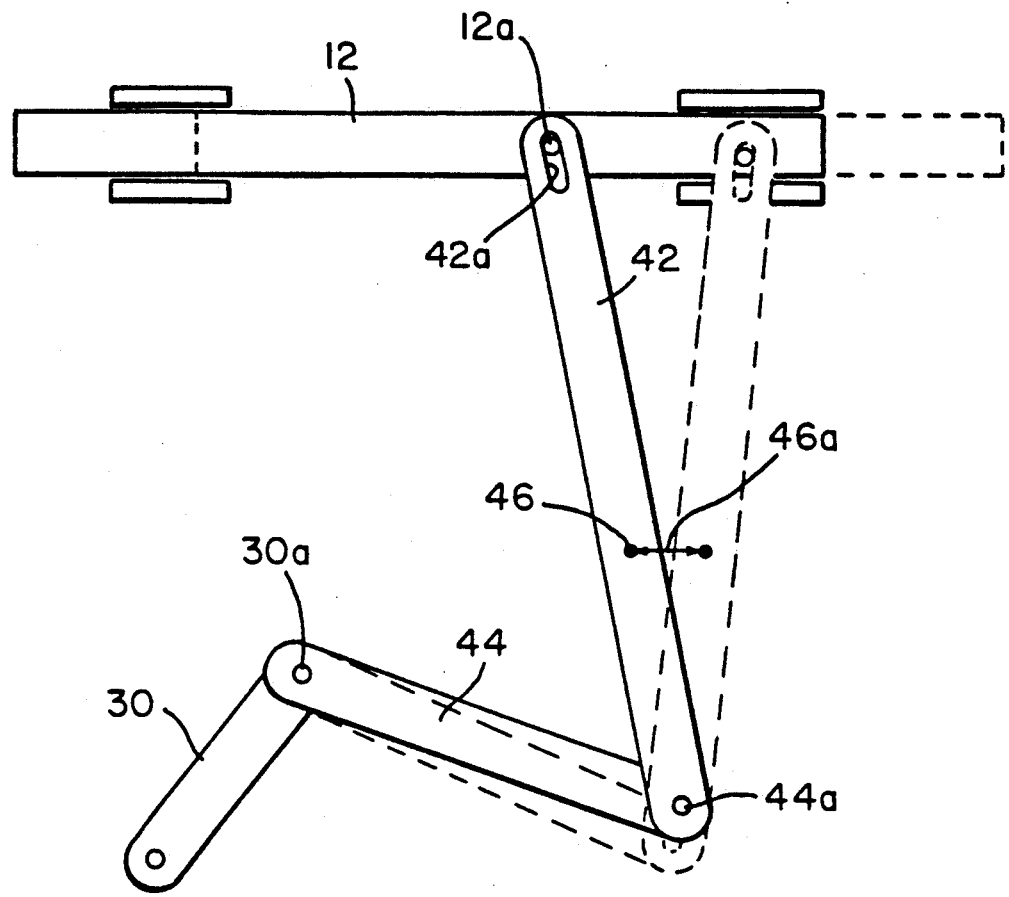
FIG. 3 is a enlarged view illustrating articulation of the linkage interconnecting the range selector and ratio arms seen in FIG. 1 during a normal propulsion mode controlled by the automatic ratio controller.
Figure 4:
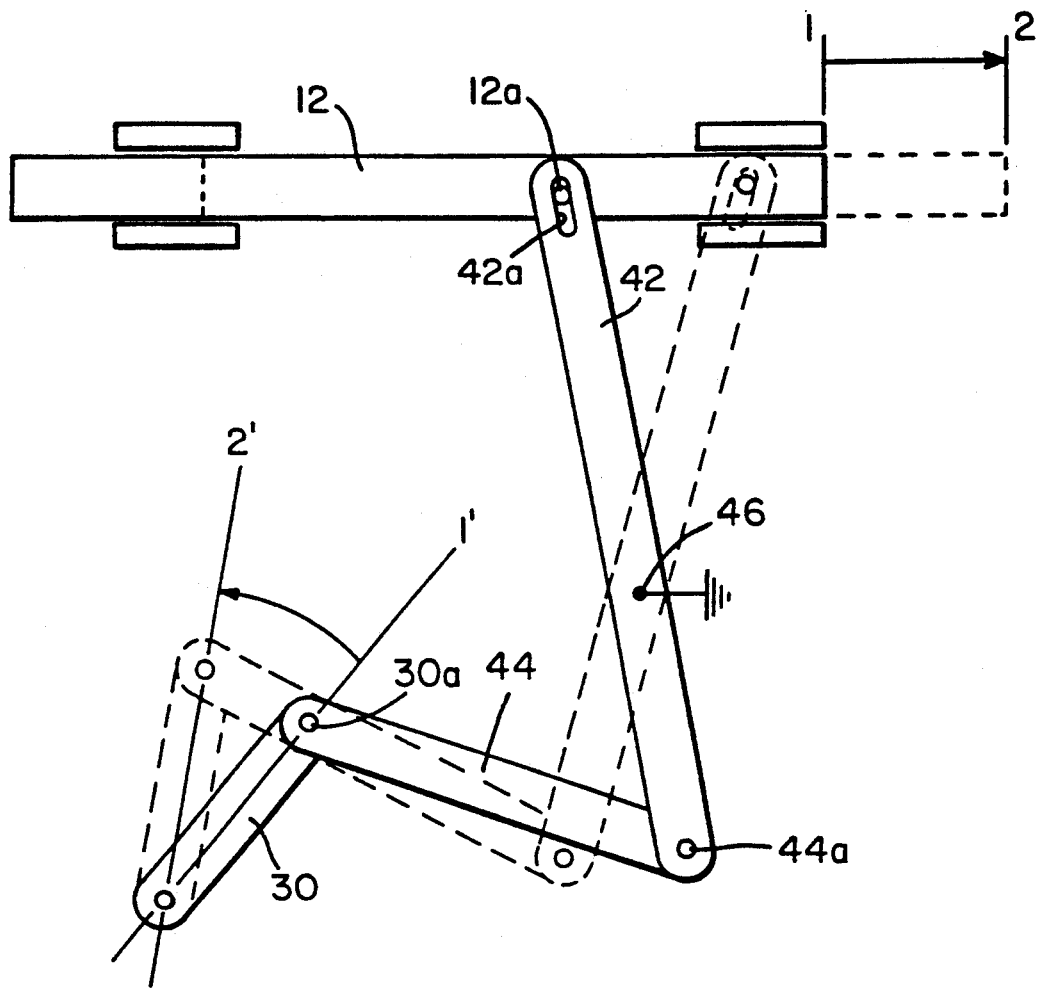
FIG. 4 is an enlarged view of the same linkage illustrating the articulation thereof during a self-recovery (manual override) propulsion mode controlled by the operator.

To implement the manual override apparatus of the present invention to a hydromechanical transmission of type described above, ratio arm 12 and range selector arm 30 are interconnected by a pair of links 42 and 44, as also seen in FIGS. 3 and 4. Link 42 is pivotally connected at one end to the free end of the ratio arm by a pin 12a carried by the latter and captured in an elongated slot 42a in the link. Link 44 is pivotally connected at 44a to the other end of link 42 and is pivotally connected at 30a to the free end of range selector arm 30. As seen in FIG. 3, if links 42 and 44 are permitted to freely articulate, stroking motions of the ratio arm and shifting motions of the range selector arm are independent of each other. However, if linkage articulation is controlled, the range selector arm becomes drivingly connected to the ratio arm, such that manual shifting motion of the former is translated into stroking motion of the latter. To this end, link 42 carries a post 46 at an appropriate position intermediate its ends. As long as this post is free to move (arrow 46a) during articulation of the links in response to movements of the range selector arm and ratio arm, these arms are interconnected in lost-motion fashion, as seen in FIG. 3. When post 46 is fixed in position, shifting motion of range selector arm 30, as between positions 1' and 2' causes the ends of link 42 to revolve about the post as a fixed pivot point, thereby imparting stroking motion to ratio arm 12, as between positions 1 and 2, as illustrated in FIG. 4. When the movement of post 46 is unrestrained, the transmission is conditioned to the normal propulsion mode, wherein propulsion is controlled by automatic ratio controller 10. Conversely, when the position of this post is fixed, the transmission is conditioned in the self-recovery propulsion mode, wherein propulsion is manually controlled by the range selector lever 28 via range selector arm 30.

To provide safe and smooth conversion between these propulsion modes, as well as convenient manual control over vehicle speed and direction, the manual override apparatus of the invention includes hydraulic circuitry for ensuring that the operator manipulates the range selector lever in the proper manner. Thus, as seen in FIG. 1, this hydraulic circuitry includes a self-recovery mechanism, generally indicated at 48, a solenoid operated self-recovery valve 50, a self-recovery relay valve 52, disconnect signal relay valve 54, and a shuttle valve 56, all interconnected by hydraulic lines. Assuming the normal propulsion mode under the control of automatic ratio controller 10 is available, valve 50 is held in the position shown by electrical energization of its actuating solenoid 50a. Hydraulic line 58 to relay valve 52, line 60 to a first range brake relay valve 62, and line 64 branching therefrom to the self-recovery mechanism are all vented at 51 and thus unpressurized. While range selector lever 28 is in the neutral-disengaged position N(D), valve positions are as shown in FIG. 1, to wit, spool 36 blocks priority hydraulic pressure from line 40 to clutch 34, the spool 66 of signal relay valve 54 is biased to its lower position by its compression spring 68, and the spool 70 of relay valve 52 is biased to its upper position by its compression spring 72.

When the range selector lever 28 shifted from the neutral-disengaged position N(D) to the neutral-engaged position N(E) (FIG. 2), spool 36 is pulled downward by disconnect selector 32, and line 40 receives priority hydraulic pressure to engage clutch 34 connecting the engine mechanical output to the transmission. In addition, the priority pressure in line 40 is communicated through signal relay valve 54 and line 74 to the upper end of spool 70 of relay valve 52, driving it downwardly to block off line 58 from solenoid valve 50 and to vent lines 60 and 64 at 53. As will be seen, this effectively locks out the self-recovery mode. By shifting range selector lever 28 to either the forward F or reverse R positions from the neutral-engaged position N(E), normal mode propulsion ensues at vehicle speeds established by automatic ratio controller 10.

In the event of an electrical failure that disables the automatic ratio controller or a failure of the controller itself, control of normal mode propulsion is lost, and conversion to the self-recovery propulsion mode is necessary to regain control over vehicle mobility. To achieve this conversion, the operator must shift range selector lever to the neutral-disengaged N(D) position and stop the vehicle. Note that until the range selector lever is in the neutral-disengaged position, priority pressure via pilot valve 32 positions spool 70 of relay valve 52 to block hydraulic line 58, and thus priority pressure PP can not be communicated to lines 60 and 64, even when the loss of electrical power de-energizes solenoid 50a of valve 50, allowing it to revert under the bias of spring 50b to a leftward position to port priority pressure to line 58. It is thus seen that conversion to the self-recovery mode is precluded until the transmission is in neutral and clutch 34 is disengaged to prevent injury to occupants and damage to the engine/transmission.

With the range selector lever 28 in the neutral-disengaged position and the vehicle engine running to drive a hydraulic pump (not shown) for developing priority hydraulic pressure, the valve spools are in the position shown in FIGURE 1. Solenoid valve 50 is in its left position, either due to an electrical failure or a manual opening of the solenoid energization circuit, porting priority pressure to first range brake relay valve 62 and to self-recovery mechanism 48. Line 76 is also pressurized to drive spool 66 of disconnect signal relay valve 54 upward, blocking off line 40. This locks the transmission in the self-recovery propulsion mode for as long as line 58 is pressurized through solenoid valve 50. The application of priority pressure to relay valve 62 effects engagement of the first range brakes, thereby conditioning the transmission to its first or lowest propulsion range. It will be appreciated that, in the normal propulsion mode, automatic ratio controller 10 controls the first range brakes directly, as well as the other range-changing brakes and clutches.

As seen in FIG. 1, self-recovery mechanism 48 includes a pair of opposed hydraulic pistons 78 and 80 mounted in a housing 82 and biased to their outermost positions by compression springs 84. The pistons confront a housing opening 86 into which extends post 46 carried by link 42. In the normal propulsion mode, the post moves freely in this opening in response to shifting movements of range selector arm 30 and stroking movements of ratio arm 12. When priority pressure is ported by the solenoid valve to line 64 and its branch lines 64a and 64b, piston 80 is driven inward toward post 46 to a reference position established by a housing stop 82a. Concurrently, piston 78 is driven inward, forcing post 46 up against the face of piston 80 in its reference position. The post is thus pinned between the pistons in a predetermined fixed position while the transmission is locked in the self-recovery mode. With range selector lever 28 in its neutral-disengaged position and by appropriate location of the reference position of piston 80, the positioning of post 46 thereagainst by piston 78 is effective to translate ratio arm 12 to its zero stroke position from whatever position it was left in upon failure of the automatic ratio controller. Range selector arm 30 and the ratio arm are thus drivingly interconnected with the neutral position of the former referenced to the zero stroke position of the latter. At zero stroke, the hydrostatic outputs of the hydrostatic drive units 16, 20 are also zero.

To produce vehicle propulsion in the self-recovery mode, range selector lever 28 is shifted leftward from its neutral-disengaged position N(D) to its neutral-engaged position N(E) (FIG. 2). Disconnect selector 32 is rotated to the ENGAGED angular position, pulling pilot valve spool downward to communicate priority pressure to line 40 and thus to effect engagement of main clutch 34. Recall that lever shifting movement between the neutral-disengaged and neutral-engaged positions does not impart shifting movement to range selector arm 30. However, shifting movement of the range selector lever 30 from the neutral-engaged position toward the forward F and reverse R positions is directly communicated to the range selector arm. Thus, forward vehicle propulsion is manually controlled by moving the range selector lever between the neutral-engaged and forward range positions, resulting a positive stroking movement of ratio arm 12 and forward propelling outputs from the hydrostatic drive units. Vehicle propulsion in the reverse direction is then produced by moving the range selector lever between the neutral-engaged and reverse range positions to produce negative stroking of the ratio arm and hydrostatic outputs in the reverse direction. Vehicle steer is accomplished in the same manner as in the normal propulsion mode by manually rotating crossarm 14.

To convert back to the normal propulsion mode, the operator must first shift the range selector lever to the neutral-disengaged position, and energization of solenoid 50a of valve 50 must be restored. The valves thus assume their positions seen in FIG. 1, and post 46 and the first range brakes are released. Upon shifting to the neutral engaged position, the normal propulsion mode is locked in, and vehicle propulsion under the control of automatic ratio controller 10 can begin.

As a safety feature to prevent equipment damage in the event the vehicle is to be towed, priority pressure PP is ported to line 88 by a valve 90 when the range selector lever is shifted to the tow position T seen in FIG. 2. With line 88 pressurized, shuttle valve 56 is driven downward to propel spool 70 of relay valve 52 to its lower most position. Line 58 is blocked to remove priority pressure from line 60 which is then vented at 53. The self-recovery mode is thus defeated even though valve 50 continues porting priority pressure to line 58. The first range brakes are then released to permit towing of the vehicle without damage to the transmission.

While the present invention has been disclosed in its application to a hydromechanical transmission, it will be appreciated that it is equally applicable to a hydrostatic transmission equipped with an automatic ratio controller. Moreover, the linkage between the ratio and range selector arms may be implemented in forms other than the two pivotally interconnect links disclosed.

It is seen that the objects set forth above, including those made apparent from the preceding Detailed Description, are efficiently attained, and since certain changes may be made in the construction set forth without departing from the scope of the present invention, it is intended that all matters of detail be taken as illustrative, and not in a limiting sense.

Having described the invention, what is claimed as new and desired to secure by Letters Patent is:

1. In a transmission having an automatic transmission ratio controller for stroking at least one hydrostatic drive unit to achieve infinitely variable speed vehicle propulsion outputs, override apparatus for providing manual control of transmission ratio in lieu of the automatic transmission ratio controller, said apparatus comprising, in combination:
   A. a ratio arm normally driven by the automatic ratio controller to vary the stroke of the hydrostatic drive unit;
   B. a range selector manually shiftable between forward and reverse positions through an intermediate neutral position to shift the transmission into forward and reverse operating ranges from a neutral condition;
   C. linkage means for linking said ratio arm with said range selector, said linkage means normally accommodating independent movements of said ratio arm and said range selector while the automatic ratio controller is operative during a normal vehicle propulsion mode; and
   D. a self-recovery mechanism operative upon conversion to a manual override vehicle propulsion mode to drivingly connect said range selector to said ratio arm via said linkage means such that manual shifting movements of said range selector are translated into hydrostatic drive unit stroking movements of said ratio arm to produce a manually controlled, variable speed hydrostatic output for propelling the vehicle.

2. The manual override apparatus defined in claim 1, wherein said self-recovery mechanism includes means for automatically moving said ratio arm to a hydrostatic drive unit zero stroke position referenced by said linkage means to said range selector while in said neutral position.

3. The manual override apparatus defined in claim 1, wherein said linkage means includes at least one link pivotally interconnected with said ratio arm and with said range selector, said link articulating freely in response to movements of said range selector and said ratio arm during said normal vehicle propulsion mode, said self-recovery mechanism acting on said link to control articulation thereof in manner such as to drivingly connect said range selector to said ratio arm during said manual override vehicle propulsion mode.

4. The manual override apparatus defined in claim 3, wherein said self-recovery mechanism includes actuating means for acting on said link while said range selector is in said neutral position to move said ratio arm to a zero stroke position, whereby shifting movements of said range selector between said neutral and forward positions strokes said ratio arm in a manner to produce variable speed forward vehicle propulsion, and shifting movements of said range selector between said neutral and reverse positions strokes said ratio arm in a manner to produce variable speed reverse vehicle propulsion.

5. The manual override apparatus defined in claim 4, wherein said linkage means includes first and second links, each having first and second ends, said first ends of said first and second links being pivotally interconnected, said second end of said first link pivotally connected with said range selector, and said second end of said second link pivotally connected with said ratio arm, said second link carrying a post intermediate said first and second ends thereof, said actuating means engaging said post to move said ratio arm to said zero stroke position and retaining said post in a reference position about which said second link pivots to translate shifting movements of said range selector into stroking movements of said ratio arm.

6. The manual override apparatus defined in claim 4, which further includes means for inhibiting action of said self-recovery mechanism until said range selector has been manually shifted to said neutral position.

7. The manual override apparatus defined in claim 5, which further includes a hydraulic circuit for activating said self-recovery mechanism.

8. The manual override apparatus defined in claim 7, wherein said hydraulic circuit includes a self-recovery valve for porting hydraulic pressure to said self-recovery mechanism, thereby causing said actuating means to move said post to said reference posit and retain said post thereat during said manual override propulsion mode.

9. The manual override apparatus defined in claim 8, wherein said hydraulic circuit further includes valve means for blocking hydraulic pressure from said self-recovery mechanism until said range selector has been manually shifted to said neutral position.

10. The manual override apparatus defined in claim 9, wherein said actuating means comprises a pair of opposed hydraulic cylinders propelled toward each other by hydraulic pressure ported thereto by said first valve to move said post to said reference position and retain said post thereat in clamped engagement between said cylinders.

11. The manual override apparatus defined in claim 9, wherein said valve means includes a pilot valve for selectively porting hydraulic pressure to engage a clutch connecting a vehicle engine to the transmission, and first (52) and second (54) relay valves, said first relay valve connected in a hydraulic line communicating hydraulic pressure from said self-recovery valve to said self-recovery mechanism, said second relay valve relaying hydraulic pressure from said pilot valve to said first relay valve to block said hydraulic line during said normal propulsion mode, and said first relay valve relaying hydraulic pressure from said self-recovery valve to said second relay valve to block hydraulic pressure from said pilot valve and thereby lock in said manual override propulsion mode.

12. The override apparatus defined in claim 11, wherein said first and second relay valves are normally spring biased to positions enabling conversion between said normal and manual override propulsion modes only while said pilot valve is positioned to block hydraulic pressure to said clutch.

13. The override apparatus defined in claim 12, which further includes a vehicle operator lever for shifting said range selector between said forward, neutral and reverse positions and for shifting said pilot valve between clutch engaging and clutch disengaging positions.

14. The manually override apparatus defined in claim 13, wherein said self-recovery valve includes a solenoid and a spring, said solenoid holding said self-recovery valve in a venting position while electrically energized, and said spring biasing said self-recovery valve to a hydraulic pressure porting position while said solenoid is electrically de-energized.

15. The manual override apparatus defined in claim 14, which further includes a third relay valve (62) connected to said hydraulic line, for relaying hydraulic pressure ported from said self-recovery valve to engage the transmission in a low forward and reverse speed range.

16. The manual override apparatus defined in claim 15, which further includes a tow position to which said range selector is manually shiftable, and a fourth relay valve (90) positioned in response to said range selector being shifted to said tow position for porting hydraulic pressure to said first relay valve to block hydraulic pressure from said self-recovery valve to said self-recovery mechanism and said third relay valve, whereby to permit safe towing of the vehicle.

17. In a vehicle equipped with a transmission having an automatic ratio controller for stroking at least one hydrostatic drive unit to achieve infinitely variable speed vehicle propulsion, a method for manually controlling vehicle propulsion in lieu of the controller, said method comprising the steps of:

A. providing a ratio arm normally driven by the controller to vary the stroke of the hydrostatic drive unit during a normal vehicle propulsion mode;
B. providing a range selector manually shiftable between a forward position and a reverse position through an intermediate neutral position to accommodate operator selection of the direction of vehicle propulsion during the normal propulsion mode;
C. shifting the range selector to the neutral position preparatory to converting to a manual override vehicle propulsion mode;
D. activating a self-recovery mechanism to stroke the ratio arm to a zero stroke position and to drivingly interconnect the ratio arm and the range selector;
E. shifting the range selector between the neutral and forward positions to manually control variable speed, forward hydrostatic propulsion of the vehicle; and
F shifting the range selector between the neutral and reverse positions to manually control variable speed, reverse hydrostatic propulsion of the vehicle.

18. The method defined in claim 17, which further includes the step of inhibiting said self-recovery mechanism activating step until the range selector is shifted to the neutral position.

19. The method defined in claim 18, which further includes the step of locking the transmission in either of the normal and manual override vehicle propulsion modes until the range selector is shifted to the neutral position and the transmission is de-clutched from the vehicle engine.

20. The method defined in claim 19, which further includes the steps of engaging the transmission in a low forward and reverse speed range concurrently with said self-recovery mechanism activating step, shifting the range selector to a tow position, and concurrently deactivating the self-recovery mechanism and dis-engaging the transmission from the low forward and reverse speed range, whereby to accommodate safe vehicle towing.

* * * * *